US009255626B2

(12) United States Patent
Bouwer et al.

(10) Patent No.: US 9,255,626 B2
(45) Date of Patent: Feb. 9, 2016

(54) ROTORCRAFT AND PLANETARY GEAR SYSTEMS

(71) Applicant: The Boeing Company, Huntington Beach, CA (US)

(72) Inventors: Scott Hendrik Bouwer, Wilmington, DE (US); Mark Joseph Robuck, Chadds Ford, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/301,263

(22) Filed: Jun. 10, 2014

(65) Prior Publication Data

US 2015/0354668 A1 Dec. 10, 2015

(51) Int. Cl.
| | | |
|---|---|---|
| *F16H 1/46* | (2006.01) | |
| *B64C 27/12* | (2006.01) | |
| *B64C 27/10* | (2006.01) | |

(52) U.S. Cl.
CPC ........ *F16H 1/46* (2013.01); *B64C 27/10* (2013.01); *B64C 27/12* (2013.01)

(58) Field of Classification Search
CPC ......... F16H 1/46; F16H 57/08; F16H 1/2836; F16H 1/2845; F16H 2001/2872; F16H 2001/2881; B64C 27/10; B64C 27/12
USPC .................. 475/331, 338, 339, 340, 341, 342
See application file for complete search history.

(56) References Cited

U.S. PATENT DOCUMENTS

| | | | | |
|---|---|---|---|---|
| 2,053,130 | A | * 9/1936 | Cheyne | ...................... F16H 1/28 475/296 |
| 3,234,821 | A | * 2/1966 | Himmel | .................. F16H 3/663 475/279 |
| 3,258,995 | A | 7/1966 | Etal | |
| 3,640,150 | A | * 2/1972 | Leiner | ...................... B64C 13/34 475/332 |
| 4,751,855 | A | 6/1988 | Hudson et al. | |
| 4,882,943 | A | 11/1989 | Pipon et al. | |
| 5,120,285 | A | * 6/1992 | Grimm | ................... B64C 13/28 475/205 |
| 5,133,698 | A | * 7/1992 | Hermans | .................. B64C 13/34 475/332 |
| 5,385,514 | A | * 1/1995 | Dawe | ...................... F16H 13/06 475/336 |

(Continued)

FOREIGN PATENT DOCUMENTS

| | | | | |
|---|---|---|---|---|
| DE | 4234873 A1 | * 4/1994 | ................ | F16H 1/46 |
| DE | 19845182 A1 | * 4/2000 | ................ | F16H 1/46 |

(Continued)

OTHER PUBLICATIONS

"Compound Planetary Rotary Actuator," webpage downloaded from www.zakgear.com/Power_Hinge.html on Apr. 7, 2014.

(Continued)

*Primary Examiner* — Roger Pang
(74) *Attorney, Agent, or Firm* — DASCENZO Intellectual Property Law, P.C.

(57) ABSTRACT

Planetary gear systems, transmissions, and apparatuses include at least one non-fixed annular gear, at least one non-fixed sun gear, at least one compound planet gear meshed between the at least one non-fixed annular gear and the at least one non-fixed sun gear, and at least one fixed gear meshed with the at least one compound planet gear. Rotational input to one of the at least one non-fixed annular gear and the at least one non-fixed sun gear results in an opposite rotational output of the other of the at least one non-fixed annular gear and the at least one non-fixed sun gear.

21 Claims, 8 Drawing Sheets

(56) References Cited

U.S. PATENT DOCUMENTS

| | | | |
|---|---|---|---|
| 5,518,466 A | 5/1996 | Tiedeman | |
| 5,910,066 A * | 6/1999 | Schulz | F16H 1/2863 475/331 |
| 6,123,640 A * | 9/2000 | Schulz | F16H 1/46 475/336 |
| 6,554,734 B1 * | 4/2003 | Maydew | B64C 13/34 475/248 |
| 6,875,145 B2 * | 4/2005 | McKay | B64C 13/24 475/263 |
| 7,121,973 B2 | 10/2006 | Lumpkin et al. | |
| 7,507,180 B2 | 3/2009 | Robuck | |
| 2011/0021307 A1 * | 1/2011 | Davies | F16H 1/28 475/254 |
| 2014/0049784 A1 | 2/2014 | Woloschyn | |

FOREIGN PATENT DOCUMENTS

| | | |
|---|---|---|
| EP | 2551550 | 1/2013 |
| WO | WO2011/100499 | 8/2011 |

OTHER PUBLICATIONS

Extended European Search Report for related foreign patent EP 15165606, European Patent Office, Oct. 15, 2015.

* cited by examiner

ROTORCRAFT AND PLANETARY GEAR SYSTEMS

FIELD

The present disclosure relates to rotorcraft and planetary gear systems.

BACKGROUND

With reference to the schematic illustrations of FIGS. 1-2, prior art planetary gear trains 10 include a series of planet gears 12, a sun gear 14, an annular, or ring, gear 16, and a carrier 18. The sun gear and the annular gear are coaxially aligned, with the planet gears being spaced around and meshed between the sun gear and the annular gear. The carrier interconnects the rotational axes of the planet gears. One of the sun gear and the annular gear is grounded, or fixed, with the other of the sun gear and the annular gear being freely rotatable, or unfixed. Accordingly, with reference to FIG. 1, when the sun gear is fixed, a rotational input of the annular gear results in a rotational output of the carrier, and vice versa. With reference to FIG. 2, when the annular gear is fixed, a rotational input of the sun gear results in a rotation output of the carrier, and vice versa. In both configurations and as schematically indicated in FIGS. 1-2, the rotational direction of the input is the same as the rotational direction of the output.

Planetary gear trains are used in a variety of applications to transmit a rotational input having a frequency of rotation (e.g., rotations per minute, or RPM) and torque to a rotational output having a different frequency of rotation and/or torque. When compared to other configurations of transmissions, planetary gear trains typically provide the advantages of a coaxial input and output, a compact and radially symmetrical design, and a high efficiency of energy transfer (i.e., low frictional losses); however, significant forces are required to be transferred between the planet gears and the carrier, resulting in heavy bearing assemblies being required. Moreover, regular maintenance and lubrication of the bearing assemblies are required.

In applications associated with rotorcraft, such as the transmission of a high RPM and low torque engine input to a low RPM and high torque rotor output with a reduction ratio on the order of 60:1, the weight and maintenance of the transmission components can be significant. Existing rotorcraft transmissions rely on a high final drive ratio to reduce or eliminate intermediate reduction stages, which minimizes overall transmission system weight. However, prior art transmissions that utilize planetary gear trains rely on large diameter planet gears to achieve the desired high final drive ratio, and because force is transferred to the carrier by the center of the planet gears via bearing assemblies, the mechanical advantage of the transmission is limited by the diameter of the planet gears. As such, larger planet gears are needed to achieve higher reduction ratios. Larger planet gears limit the number of planet gears that can be used, increase system weight, increase system envelope, and reduce load sharing across multiple planet gears. Accordingly, there is a need for lighter weight, lower maintenance, larger reduction ratios, and smaller envelopes associated with planetary gear trains, such as in applications associated with rotorcraft.

SUMMARY

Planetary gear systems, transmissions, and apparatuses, such as rotorcraft, are disclosed herein. A planetary gear system according to the present disclosure includes at least one non-fixed annular gear, at least one non-fixed sun gear, at least one compound planet gear meshed between the at least one non-fixed annular gear and the at least one non-fixed sun gear, and at least one fixed gear meshed with the at least one compound planet gear. Rotational input to one of the at least one non-fixed annular gear and the at least one non-fixed sun gear results in rotational output of the other of the at least one non-fixed annular gear and the at least one non-fixed sun gear. Some planetary gear systems according to the present disclosure also may be configured so that a rotational input of a non-fixed gear results in rotational outputs of two, separate non-fixed gears.

Transmissions according to the present disclosure include a planetary gear system according to the present disclosure, an input shaft that is operatively coupled to one of the non-fixed annular gear and the non-fixed sun gear, an output shaft that is operatively coupled to the other of the non-fixed annular gear and the non-fixed sun gear, and a housing operatively coupled to the fixed gear. Accordingly, rotation of the input shaft results in rotation of the output shaft. Some transmissions according to the present disclosure may include two output shafts that are configured to rotate in response to rotation of the input shaft.

Rotorcraft according to the present disclosure include a fuselage, a transmission having a planetary gear system according to the present disclosure, an engine operatively supported by the fuselage and operatively coupled to the input shaft of the transmission, and a rotor operatively coupled to the output shaft of the transmission.

DESCRIPTION

Figure 1:
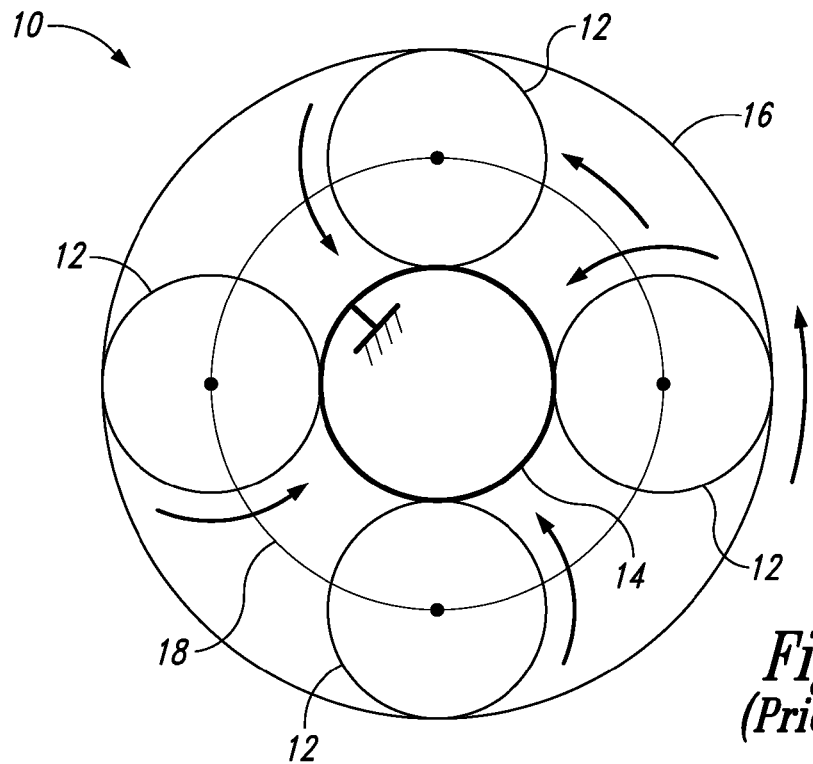
FIG. 1 is a schematic representation of prior art planetary gear trains.
Figure 2:
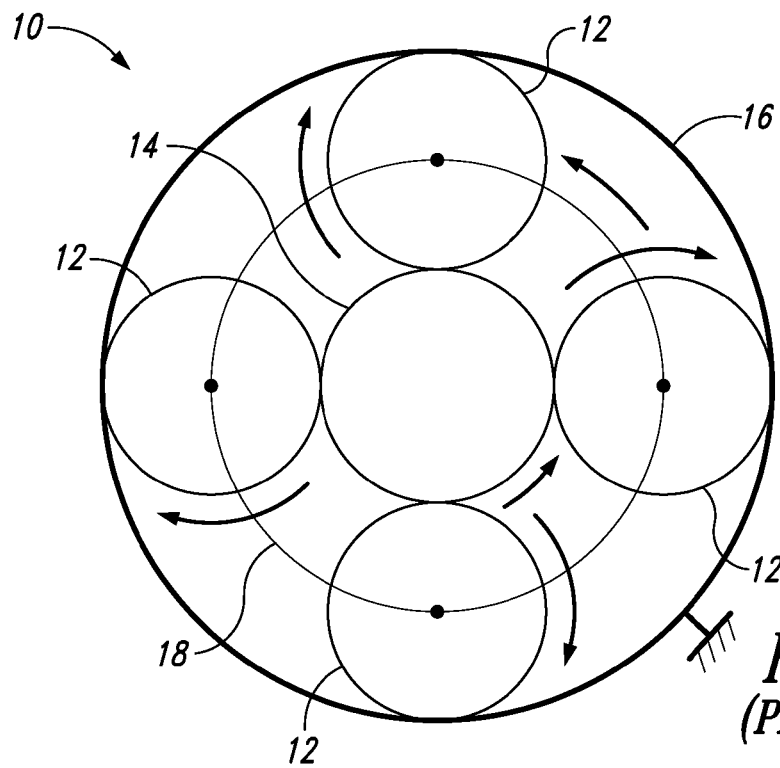
FIG. 2 is another schematic representation of prior art planetary gear trains.

Planetary gear systems and transmissions and apparatuses that include planetary gear systems are disclosed herein. Various planetary gear systems according to the present disclosure are schematically presented in FIGS. 3-6 and are indicated generally at 100. Planetary gear systems 100 additionally or alternatively may be described as or referred to as planetary gear trains 100 or as epicyclic gear systems, or gear trains, 100. Planetary gear systems 100 include at least one non-fixed annular gear 102, at least one non-fixed sun gear 104, at least one compound planet gear 106 meshed between the at least one non-fixed annular gear and the at least one non-fixed sun gear, and at least one fixed gear 108 meshed with the at least one compound planet gear. In contrast to the prior art planetary gear trains 10 of FIGS. 1-2, some planetary gear systems 100 may not include, and/or may not require inclusion of, a carrier interconnecting a plurality of planet gears. Accordingly, some planetary gear system 100 may be described as being free of a carrier and/or as the planet gears not being directly tied together. As a result, no bearings, such as roller bearings, are required to transfer force from the planet gears to and/or from a carrier used as a rotational input or rotational output, resulting in reduced weight and maintenance of planetary gear systems 100 when compared to prior art planetary gear trains. However, it is within the scope of the present disclosure that some planetary gear systems 100 may include a carrier that interconnects a plurality of planet gears. Moreover, when included within a planetary gear system 100, a carrier may not be used as a rotational input or rotational output, and instead may be provided solely to constrain and align the planet gears. Because the optional carrier is not being used as a rotational input and/or a rotational output, the carrier geometry and associated bearings are not required to carry and/or transfer the significant forces associated with prior art planetary gear trains. Throughout the figures, the various gears of planetary gear systems 100 are illustrated without teeth to facilitate illustration; however, it is understood that the various gears include corresponding teeth of any suitable configuration. Moreover, while FIGS. 3-6 do not schematically illustrate a carrier interconnecting the planet gears, an optional carrier may be included in optional embodiments, as discussed above.

In planetary gear systems 100, a rotational input to one of the non-fixed annular gear 102 and the non-fixed sun gear 104 results in a rotational output of the other of the non-fixed annular gear and the non-fixed sun gear. As discussed further herein, some planetary gear systems 100 include more than one non-fixed sun gear 104, and some planetary gear systems 100 include more than one non-fixed annular gear 102. Moreover, while each of the schematic representations of the planetary gear systems 100 of FIGS. 3-6 include four planet gears 106, any number of suitable planet gears may be included within a planetary gear system 100, including one or more planet gears, for example, depending on a particular application of the planetary gear system.

A sun gear of a planetary gear system 100 is an external, or pinion, gear, that is, a gear with radially outward directed teeth. An annular gear of a planetary gear system 100 is a gear that has radially inward directed teeth. An annular gear additionally or alternatively may be referred to as or described as a ring gear and/or as an internal gear. Moreover, an annular gear shares a central axis with the sun gear(s) of a planetary gear system 100. A planet gear of a planetary gear system 100 is a pinion gear that is meshed between at least one annular gear and at least one sun gear.

Gears of a planetary gear system may be fixed or non-fixed. A fixed gear is a gear that is fixed, or grounded, relative to a non-fixed gear and does not rotate with respect to a frame, housing, or other structure by which the planetary gear system is supported, and a non-fixed gear is configured to rotate about its central axis relative to a frame, housing, or other structure by which the planetary gear system is supported. Accordingly, sun gears and annular gears of a planetary gear system 100 share a central axis. A non-fixed sun gear 104 and a non-fixed annular gear 102 are configured to rotate about a primary rotation axis 110. A fixed gear 108 has a central axis that is coaxial with the primary rotation axis. Fixed gears are schematically represented in the figures with a grounded symbol.

Planet gears of planetary gear systems 100 each include an axis of rotation 112 that is spaced away from the primary rotation axis 110, but the one or more planet gears of a planetary gear system orbit, or travel, around the primary axis rotation 110. Accordingly, planet gears may be described as non-fixed gears.

Compound planet gears 106 include at least two external gears, or sets of gear teeth, that are fixed relative to a common shaft and that share the same axis of rotation 112, but with the individual external gears of the compound planet gear typically having different pitch diameters. However, it also is within the scope of compound planet gears to have two or more spaced apart external gear sections having the same pitch diameter. A set of gear teeth or an individual external gear section of a compound planet gear may be referred to as a stage or gear stage of the compound planet gear. Additionally or alternatively, two spaced-apart gear sections having the same pitch diameter also may be described as forming a single gear stage of a compound planet gear. Individual gear stages and/or the combination of two or more gear stages of a compound planet gear, together with the corresponding gear or gears with which the gear stages are meshed, may define a double helical mesh configuration and/or a C-gear (curved teeth) configuration, to maintain the mesh, and axial constraint, of the compound planet gears with the corresponding gear or gears.

Figure 3:
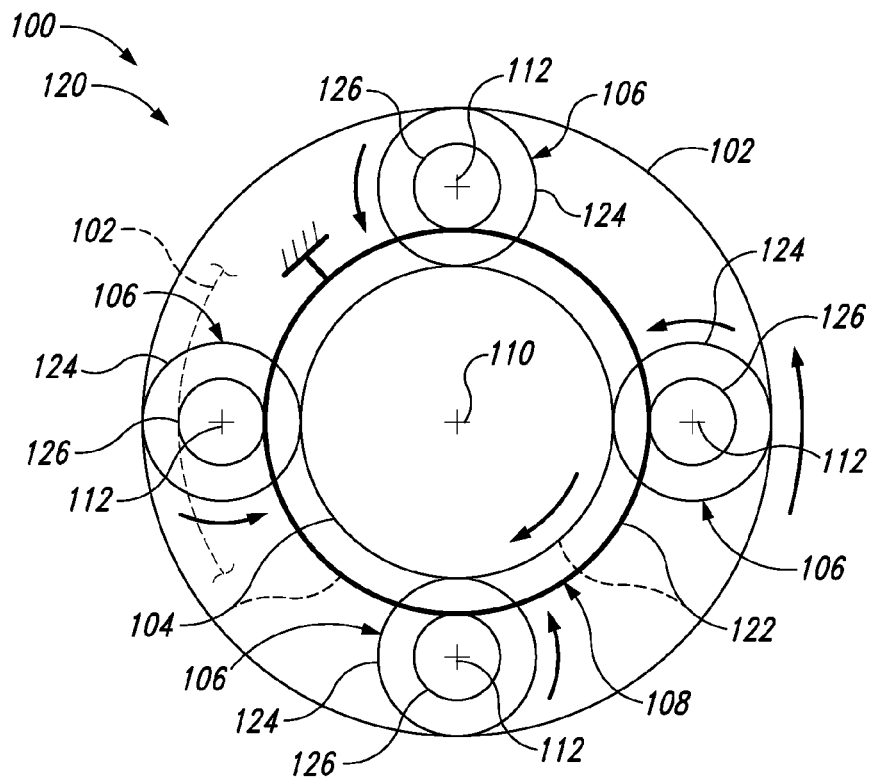
FIG. 3 is a schematic representation of planetary gear systems according to the present disclosure.

With reference first to FIG. 3, examples of planetary gear systems 100 are schematically represented and generally indicated at 120. Planetary gear systems 120 include a non-fixed annular gear 102, a non-fixed sun gear 104, at least one compound planet gear 106, and a fixed gear 108 in the form of a fixed sun gear 122. Each compound planet gear 106 is operatively positioned between and meshed with (i) the non-fixed annular gear and (ii) the non-fixed sun gear and the fixed sun gear. Each compound planet gear includes a larger planet gear stage 124 and a smaller planet gear stage 126. The larger planet gear stage may be described as having a larger pitch diameter, and the smaller planet gear stage may be described as having a smaller pitch diameter that is less than the larger pitch diameter. In some planetary gear systems 120, the larger planet gear stage is meshed between the non-fixed sun gear 104 and the non-fixed annular gear 102, while the smaller planet gear stage is meshed only with the fixed sun gear 122. However, as schematically and optionally illustrated in dashed lines in FIG. 3, it also is within the scope of planetary gear systems 120 that the smaller planet gear stage 126 is meshed between the non-fixed annular gear 102 and the fixed sun gear 122, while the larger planet gear stage 124 is meshed only with the non-fixed sun gear 104. Additionally or alternatively, as indicated with dashed lead lines for 104 and 122 in FIG. 3, it also is within the scope of planetary gear systems 120 that the non-fixed sun gear 104 is meshed with the smaller planet gear stage 126 and that the fixed sun gear 122 is meshed with the larger planet gear stage 124. In such a configuration, the non-fixed sun gear therefore would have a larger pitch diameter than the fixed sun gear. Depending on the relative sizes of the pitch diameters of the stages of the compound planet gears and their respective meshing with the sun gears and the annular gear, rotation of the non-fixed annular gear 102 may result in an opposite rotation of the non-fixed sun gear 104, and vice versa, as schematically represented by the arrows in FIG. 3. However, some configurations of planetary gear systems 120, depending on the relative sizing and respective meshing of the compound planet gear stages, may result in an output that is in the same rotational direction as the input.

Figure 4:
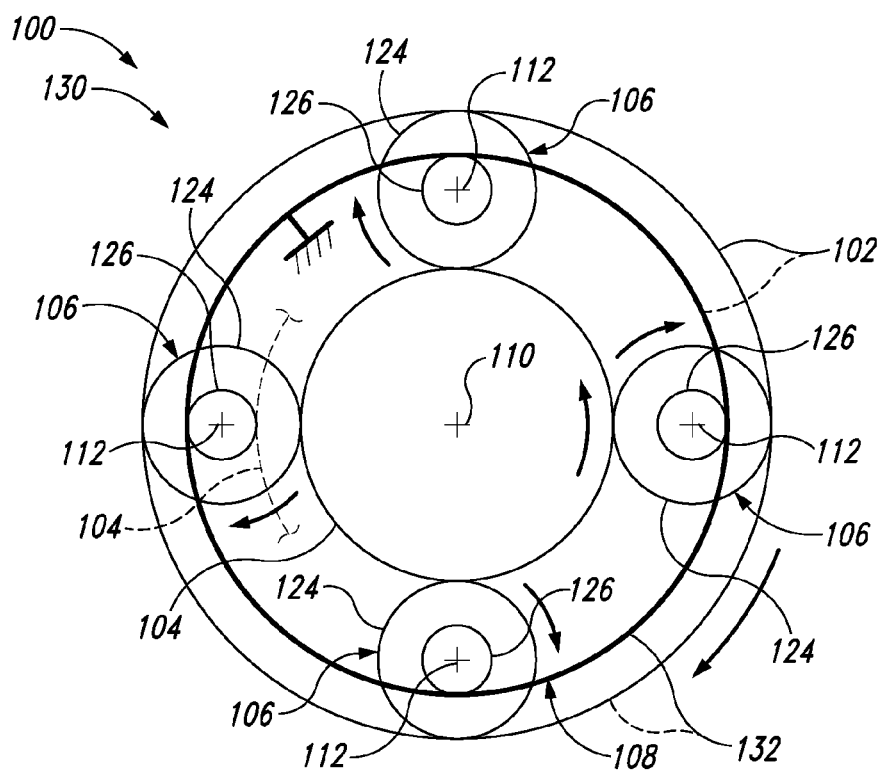
FIG. 4 is a schematic representation of planetary gear systems according to the present disclosure.

Turning now to FIG. 4, additional examples of planetary gear systems 100 are schematically represented and generally indicated at 130. Similar to planetary gear systems 120, planetary gear systems 130 include a non-fixed annular gear 102, a non-fixed sun gear 104, and at least one compound planet gear 106. However, unlike planetary gear systems 120, planetary gear systems 130 include a fixed gear 108 in the form of a fixed annular gear 132. Each compound planet gear 106 is operatively positioned between and meshed with (i) the non-fixed sun gear 104 and (ii) the non-fixed annular gear 102 and the fixed annular gear 132. Each compound planet gear includes a larger planet gear stage 124 and a smaller planet gear stage 126. In some planetary gear systems 130, the larger planet gear stage 124 is meshed between the non-fixed annular gear 102 and the non-fixed sun gear 104, while the smaller planet gear stage is meshed only with the fixed annular gear 132. However, as schematically and optionally illustrated in dashed lines in FIG. 4, it also is within the scope of planetary gear systems 130 that the smaller planet gear stage 126 is meshed between the fixed annular gear 132 and the non-fixed sun gear 104, while the larger planet gear stage 124 is meshed only with the non-fixed annular gear 102. Additionally or alternatively, as indicated with dashed lead lines for 102 and 132 in FIG. 4, it also is within the scope of planetary gear systems 130 that the non-fixed annular gear 102 is meshed with the smaller planet gear stage 126 and that the fixed annular gear 132 is meshed with the larger planet gear stage 124. In such a configuration, the non-fixed annular gear would therefore have a smaller pitch diameter than the fixed annular gear. Depending on the relative sizes of the pitch diameters of the stages of the compound planet gears and their respective meshing with the annular gears and the sun gear, rotation of the non-fixed annular gear 102 may result in an opposite rotation of the non-fixed sun gear 104, and vice versa, as schematically represented by the arrows in FIG. 4. However, some configurations of planetary gear systems 130, depending on the relative sizing and respective meshing of the compound planet gear stages, may result in an output that is in the same rotational direction as the input.

With both planetary gear systems 120 and planetary gear systems 130, a rotational input of a non-fixed gear results in a rotational output of a single, separate non-fixed gear. However, planetary gear systems 100 also may be configured so that a rotational input of a non-fixed gear results in rotational outputs of two, separate non-fixed gears.

Figure 5:
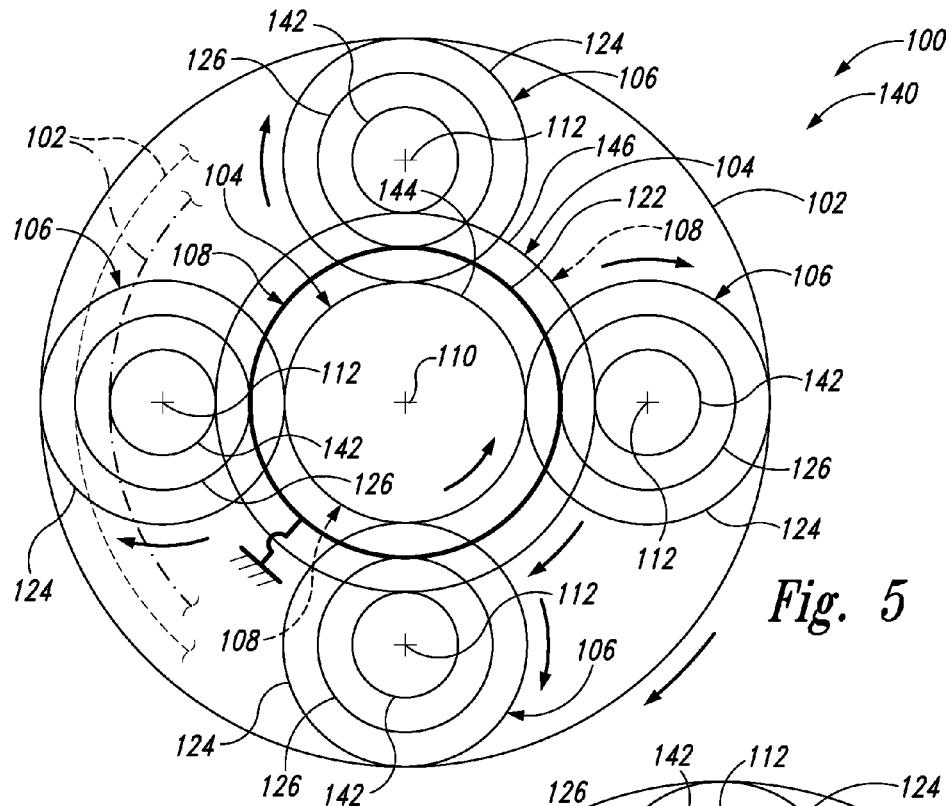
FIG. 5 is a schematic representation of planetary gear systems according to the present disclosure.

For example, with reference to FIG. 5, examples of such planetary gear systems 100 are schematically represented and generally indicated at 140. Planetary gear systems 140 include a non-fixed annular gear 102, two non-fixed sun gears 104, at least one compound planet gear 106, and a fixed gear 108 in the form of a fixed sun gear 122. Each compound planet gear 106 includes a larger planet gear stage 124, a smaller planet gear stage 126, and a smallest planet gear stage 142 having a smallest pitch diameter that is smaller than the smaller pitch diameter of the smaller planet gear stage. In FIG. 5, the two non-fixed sun gears 104 are denoted as a first non-fixed sun gear 144 and a second non-fixed sun gear 146, with the first non-fixed sun gear having a pitch diameter that is smaller than a pitch diameter of the fixed sun gear 122, and with the pitch diameter of the fixed sun gear being smaller than a pitch diameter of the second non-fixed sun gear. In some planetary gear systems 140, the larger planet gear stage 124 is meshed between the non-fixed annular gear 102 and the first non-fixed sun gear 144, while the smaller planet gear stage 126 is meshed only with the fixed sun gear 122, and while the smallest planet gear stage 142 is meshed only with the second non-fixed sun gear 146. However, as schematically and optionally illustrated in dashed lines and dash dot lines in FIG. 5, it also is within the scope of planetary gear systems 140 that rather than the larger planet gear stage 124 being meshed with the non-fixed annular gear 102, the smaller planet gear stage 126 or the smallest planet gear stage 142, respectively, is instead meshed with the non-fixed annular gear. Additionally or alternatively, while the illustrated example includes a fixed sun gear with a pitch diameter between the pitch diameters of the two non-fixed sun gears, it also is within the scope of planetary gear systems 140 for the fixed sun gear to have a pitch diameter that is larger than both of the two non-fixed sun gears or to have a pitch diameter that is smaller than both of the two non-fixed sun gears, with the resulting sun gears meshed with corresponding gear stages of the compound planet gears. Depending on the relative sizes of the pitch diameters of the stages of the compound planet gears and their respective meshing with the sun gears and the annular gear, rotation of the non-fixed annular gear may result in rotation of the second non-fixed sun gear 146 in the same rotational direction as the non-fixed annular gear, and rotation of the first non-fixed sun gear 144 in an opposite rotational direction, as schematically represented by the arrows in FIG. 5. However some configurations of planetary gear systems 140, depending on the relative sizing and respective meshing of the compound planet gear stages, may result in outputs with different rotational directions.

Figure 6:
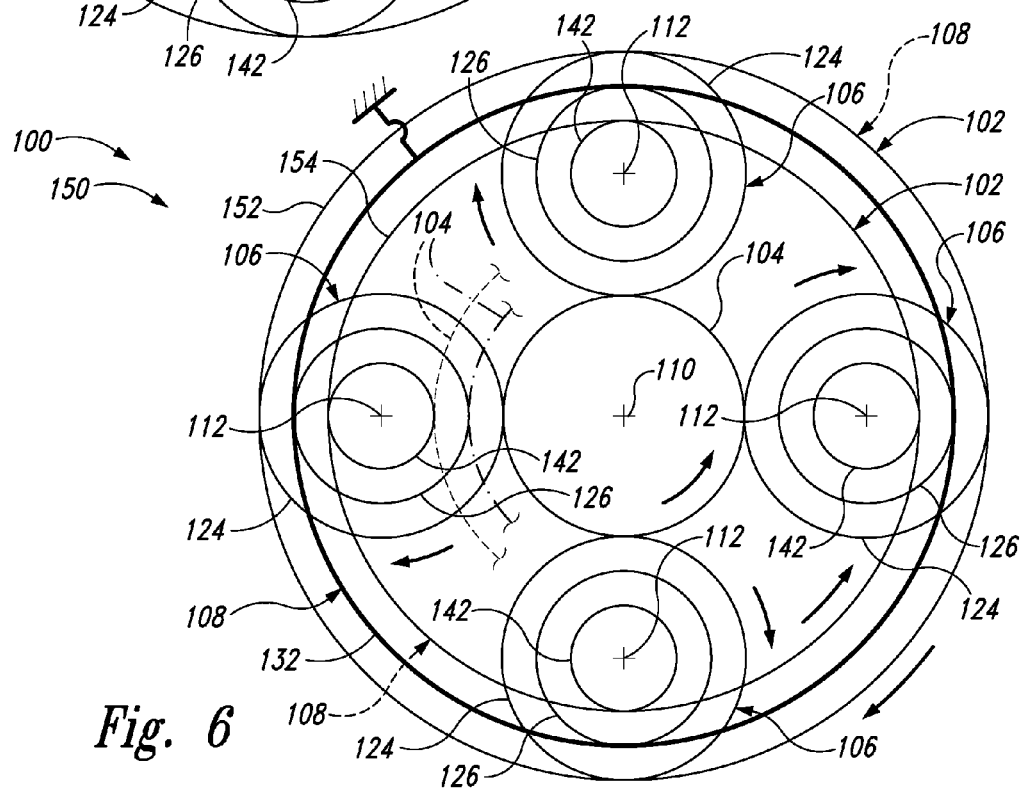
FIG. 6 is a schematic representation of planetary gear systems according to the present disclosure.

Turning now to FIG. 6, additional examples of planetary gear systems 100 with two rotational outputs resulting from a single rotational input are schematically represented and generally indicated at 150. Planetary gear systems 150 include two non-fixed annular gears 102, a single non-fixed sun gear 104, at least one compound planet gear 106, and a fixed gear 108 in the form of a fixed annular gear 132. Each compound planet gear 106 includes a larger planet gear stage 124, a smaller planet gear stage 126, and a smallest planet gear stage 142. In FIG. 6, the two non-fixed annular gears 102 are denoted as a first non-fixed annular gear 152 and a second non-fixed annular gear 154, with the first non-fixed annular gear having a pitch diameter that is larger than a pitch diameter of the fixed annular gear 132, and with the pitch diameter of the fixed annular gear being larger than a pitch diameter of the second non-fixed annular gear. In some planetary gear systems 150, the larger planet gear stage 124 is meshed between the first non-fixed annular gear 152 and the non-fixed sun gear 104, while the smaller planet gear stage 126 is meshed only with the fixed annular gear 132, and while the smallest planet gear stage is meshed only with the second non-fixed annular gear 154. However, as schematically and optionally illustrated in dashed lines and dash dot lines in FIG. 6, it also is within the scope of planetary gear systems 150 that rather than the larger planet gear stage 124 being meshed with the non-fixed sun gear 104, the smaller planet gear stage 126 or the smallest planet gear stage 142, respectively, is instead meshed with the non-fixed sun gear. Additionally or alternatively, while the illustrated example includes a fixed annular gear with a pitch diameter between the pitch diameters of the two non-fixed annular gears, it also is within the scope of planetary gear systems 150 for the fixed annular gear to have a pitch diameter that is larger than both of the two non-fixed annular gears or to have a pitch diameter than is smaller than both of the two non-fixed annular gears, with the resulting annular gears meshed with corresponding gear stages of the compound planet gears. Depending on the relative sizes of the pitch diameters of the stages of the compound planet gears and their respective meshing with the annular gears and the sun gear, rotation of the non-fixed sun gear may result in rotation of the second non-fixed annular gear 154 in the same rotational direction as the non-fixed sun gear and rotation of the first non-fixed annular gear 152 in an opposite rotational direction, as schematically represented by the arrows in FIG. 6. However some configurations of planetary gear systems 150, depending on the relative sizing and respective meshing of the compound planet gear stages, may result in different rotational outputs.

Figure 7:
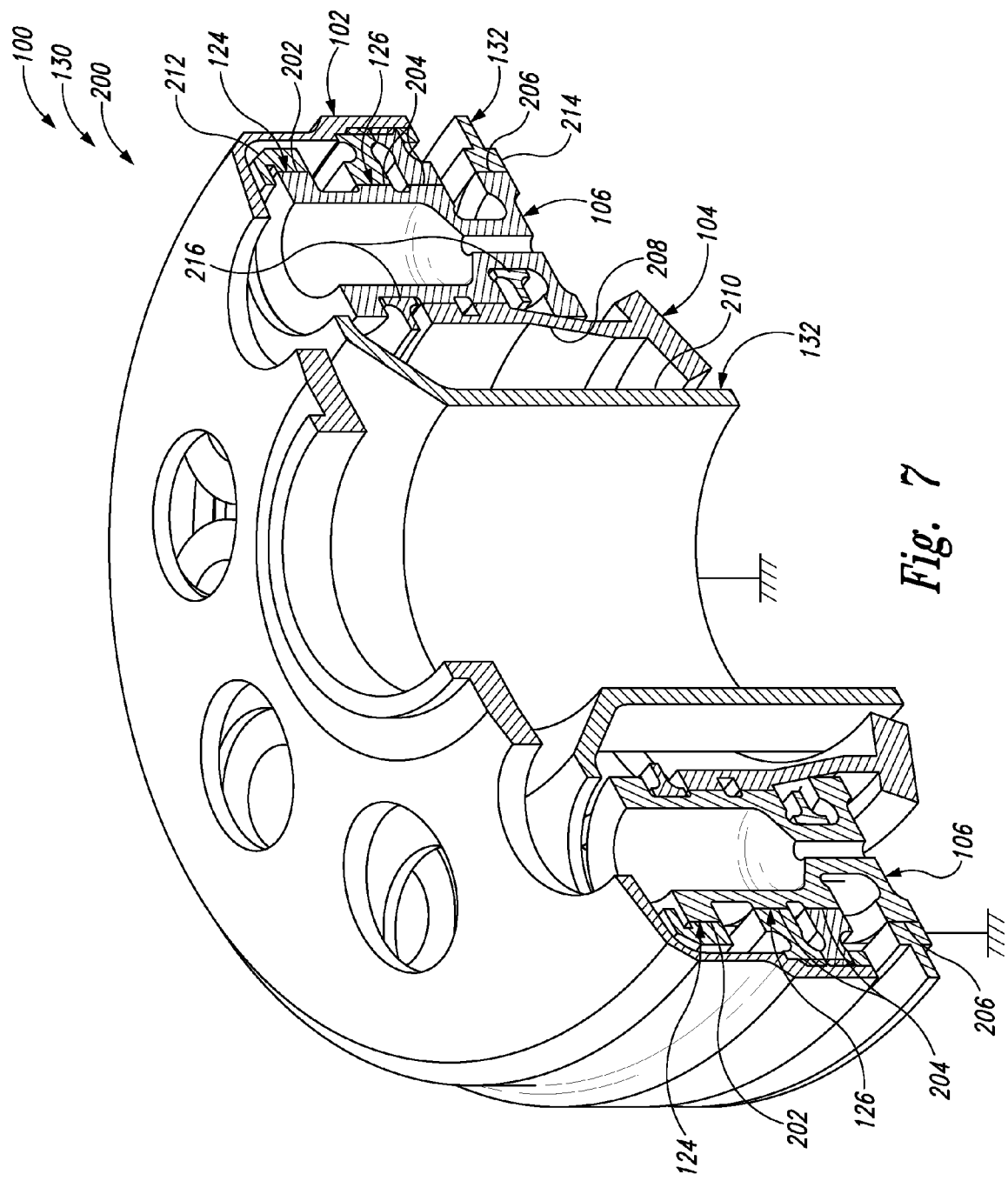
FIG. 7 is an isometric cross-sectional view of an example of a planetary gear system according to the present disclosure.
Figure 8:
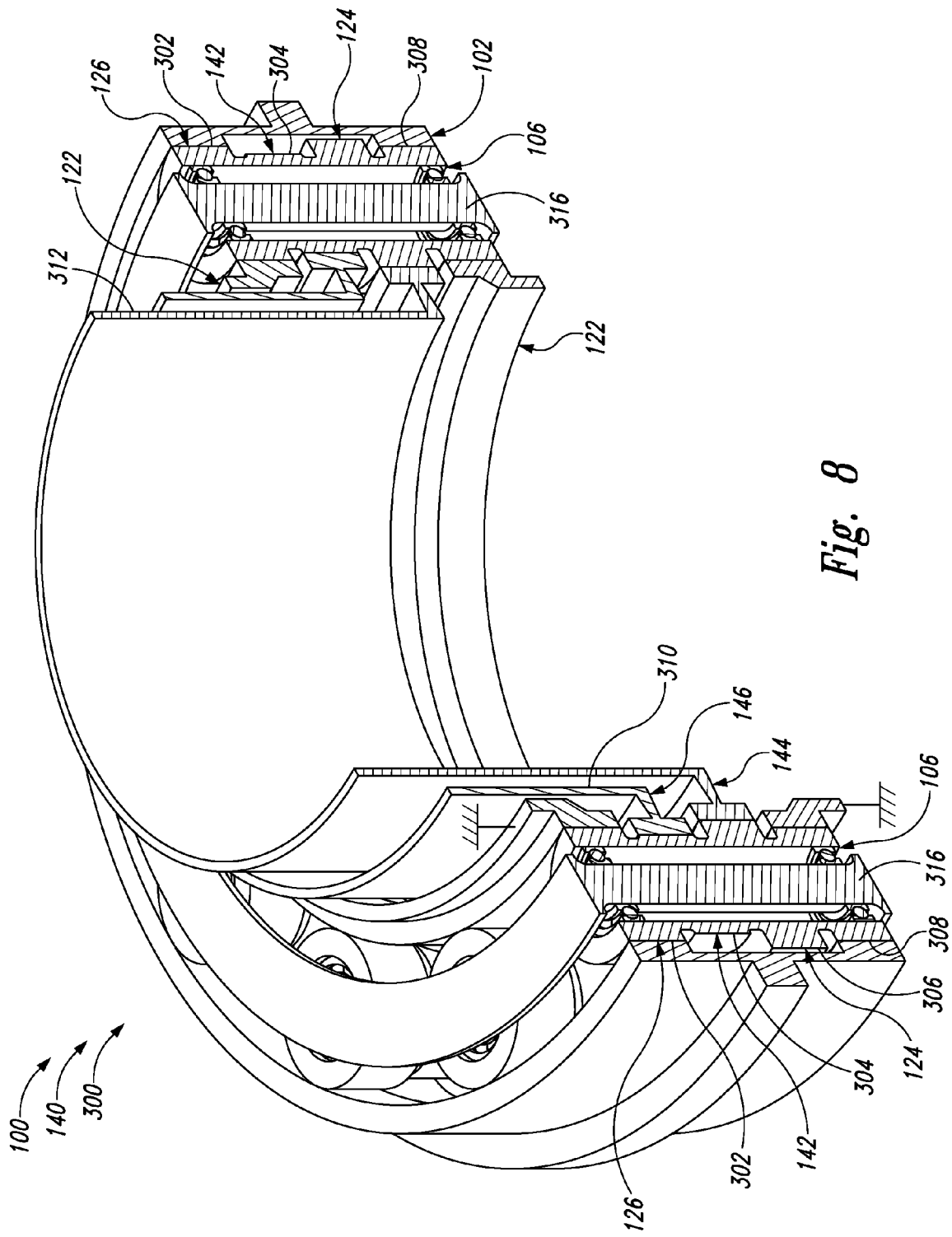
FIG. 8 is an isometric cross-sectional view of another example of a planetary gear system according to the present disclosure.
Figure 9:
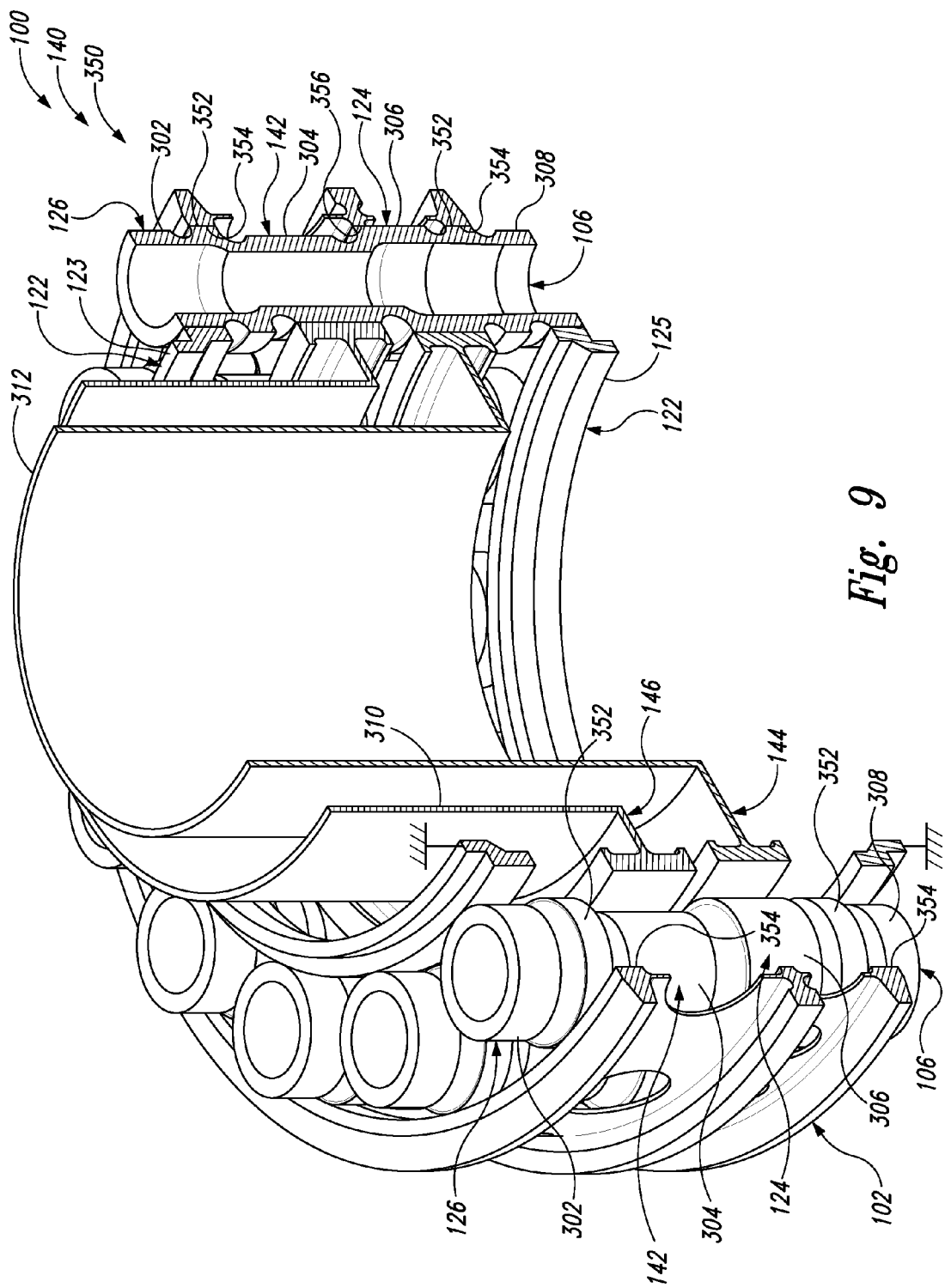
FIG. 9 is an isometric cross-sectional view of another example of a planetary gear system according to the present disclosure.

Turning now to FIGS. 7-9, illustrative non-exclusive examples of planetary gear systems 100 are illustrated and designated as planetary gear system 200, planetary gear system 300, and planetary gear system 350, respectively. Where appropriate, the reference numerals from the schematic illustrations of FIGS. 3-6 are used to designate corresponding parts of planetary gear systems 200, 300, and 350; however, the examples of FIGS. 7-9 are non-exclusive and do not limit planetary gear systems 100 to the illustrated embodiments of planetary gear systems 200, 300, and 350. That is, planetary gear systems 100 are not limited to the specific embodiments of FIGS. 7-9, and planetary gear systems 100 may incorporate any number of the various aspects, configurations, characteristics, properties, etc. of planetary gear systems that are illustrated in and discussed with reference to the schematic representations of FIGS. 3-6 and/or the embodiments of FIGS. 7-9, as well as variations thereof, without requiring the inclusion of all such aspects, configurations, characteristics, properties, etc.

With reference first to the illustrative, non-exclusive example of FIG. 7, planetary gear system 200 is an example of a planetary gear system 130, such as schematically illustrated in FIG. 4 and discussed herein. The compound planet gears 106 of planetary gear system 200 each include an upper gear stage 202, a middle gear stage 204, and a lower gear stage 206. The upper gear stage and lower gear stage of each compound planet gear have the same pitch diameter and are meshed with the fixed annular gear 132, and the middle gear stage is meshed between the non-fixed annular gear 102 and the non-fixed sun gear 104. Moreover, the upper gear stage and the lower gear stage of each compound planet gear collectively define the larger planet gear stage 124, and the middle gear stage defines the smaller planet gear stage 126. Accordingly, in the illustrated example, the fixed annular gear has a larger pitch diameter than the non-fixed annular gear. However, a variation on planetary gear system 200 may include the opposite, with the upper gear stage and the lower gear stage collectively defining the smaller planet gear stage, and with the middle gear stage defining the larger planet gear stage.

The non-fixed sun gear 104 of planetary gear system 200 defines a central bore 208, and the fixed annular gear 132 extends from the upper gear stages 202 of the compound planet gears over the compound planet gears to then define a shaft 210 that extends through the central bore of the non-fixed sun gear. Accordingly, planetary gear system 200 may be mounted or otherwise fixed to a housing or other grounding, or fixed, structure via the shaft 210 of the fixed annular gear 132.

Additionally, the fixed annular gear 132 of planetary gear system 200 includes a first, upper portion 212 and a second, lower portion 214, with the upper portion being meshed with the upper gear stages 202 of the compound planet gears and the lower portion being meshed with the lower gear stages 206 of the compound planet gears. Moreover, the upper portion 212 is integral with, or otherwise operatively connected to the shaft 210. While the upper portion and the lower portion collectively define the fixed annular gear, the upper portion and the lower portion may be spaced apart from each other as distinct structures without physical engagement. Such a configuration may balance the forces acting on the compound planet gears.

Planetary gear system 200 also includes two retaining rings, or bands, 216 that are operatively engaged with the compound planet gears 106. These retaining rings serve to maintain, facilitate, or otherwise ensure operative meshing of the compound planet gears with the non-fixed annular gear and the non-fixed sun gear. In the illustrated example, an upper retaining ring is positioned on the radially inward side of the compound planet gears between the upper gears 202 and the middle gears 204, and a lower retaining ring is positioned on the radially inward side of the compound planet gears between the middle gears 204 and the lower gears 206. Also within the scope of the present disclosure are retaining rings that are positioned on the radially outward side of the compound planet gears. Moreover, other configurations, placement, and numbers of retaining rings 216 may be incorporated into planetary gear systems 100 other than a planetary gear system 200. Additionally or alternatively, as discussed herein, an optional carrier may be provided that interconnects the compound planet gears of a planetary gear system 100, including a planetary gear system 200.

Turning now to the illustrative, non-exclusive example of FIG. 8, planetary gear system 300 is an example of a planetary gear system 140, such as schematically illustrated in FIG. 5 and discussed herein. The compound planet gears 106 of planetary gear system 300 each include an uppermost gear stage 302, an upper middle gear stage 304, a lower middle gear stage 306, and a lowermost gear stage 308. The uppermost gear stages and the lowermost gear stages are meshed between the fixed sun gear 122 and the non-fixed annular gear 102, the upper middle gear stages are meshed with the second non-fixed sun gear 146, and the lower middle gear stages are meshed with the first non-fixed sun gear 144. In this example, the lower middle gear stage of each compound planet gear defines the larger planet gear stage 124, the uppermost and lowermost gear stages of each compound planet gear collectively define the smaller planet gear stage 126, and the upper middle gear stage of each compound planet gear defines the smallest planet gear stage 142. However, other variations of planetary gear systems 140, as discussed herein, may be configured similarly to planetary gear system 300.

Planetary gear system 300 includes a carrier 316 interconnecting the compound planet gears 106 rather than including retaining rings as in the example of planetary gear system 200 of FIG. 7. The carrier constrains the compound planet gears and serves to maintain, facilitate, and/or otherwise ensure operative meshing of the compound planet gears with the non-fixed annular gear and the non-fixed sun gears. Unlike prior art planetary gear systems, the carrier of planetary gear system 300 is not used as an input or output.

The second non-fixed sun gear 146 of planetary gear system 300 defines a central bore 310, and the first non-fixed sun gear 144 defines a shaft 312 that extends through the central bore. Variations on planetary gear system 300 may include the reverse configuration, with the second non-fixed sun gear having a shaft that extends through a central bore of the first non-fixed sun gear.

Turning now to the illustrative, non-exclusive example of FIG. 9, planetary gear system 350 is another example of a planetary gear system 140, such as schematically illustrated in FIG. 5 and discussed herein. Similar to planetary gear system 300 of FIG. 8, the compound planet gears 106 of planetary gear system 350 each include an uppermost gear stage 302, an upper middle gear stage 304, a lower middle gear stage 306, and a lowermost gear stage 308. The uppermost gear stages and the lowermost gear stages are meshed with the fixed sun gear 122 only. The upper middle gear stages are meshed with the second non-fixed sun gear 146. The lower middle gear stages are meshed between the first non-fixed sun gear 144 and the non-fixed annular gear 102, the non-fixed annular gear having a gear section 356, as indicated in FIG. 9. In this example, the lower middle gear stage of each compound planet gear defines the larger planet gear stage 124, the uppermost and lowermost gear stages of each compound planet gear collectively define the smaller planet gear stage 126, and the upper middle gear stage of each compound planet gear defines the smallest planet gear stage 142.

In addition to including the various gear stages, the compound planet gears of planetary gear system 350 also include two spaced-apart bearing surfaces 352, and the non-fixed annular gear 102 includes corresponding two spaced-apart bearing races 354 and that are directly engaged with the bearing surfaces of the compound planet gears. The bearing surfaces and corresponding bearing races do not include teeth and have diameters that mirror and/or correspond to the pitch diameters of the larger planet gear stages 124 and the gear section 356 of the non-fixed annular gear 102. Accordingly, these surfaces react radial loads only and overcome the centrifugal forces pulling each planet gear outward to keep each planet gear operatively meshed with the sun gears. These bearing surfaces ensure operative meshing of the compound planet gears, thus not requiring a carrier as in the example of planetary gear system 300 of FIG. 8 or retaining rings as in the example of planetary gear system 200 of FIG. 7.

Similar to planetary gear system 300, the second non-fixed sun gear 146 of planetary gear system 350 defines a central bore 310, and the first non-fixed sun gear 144 defines a shaft 312 that extends through the central bore.

Figure 10:
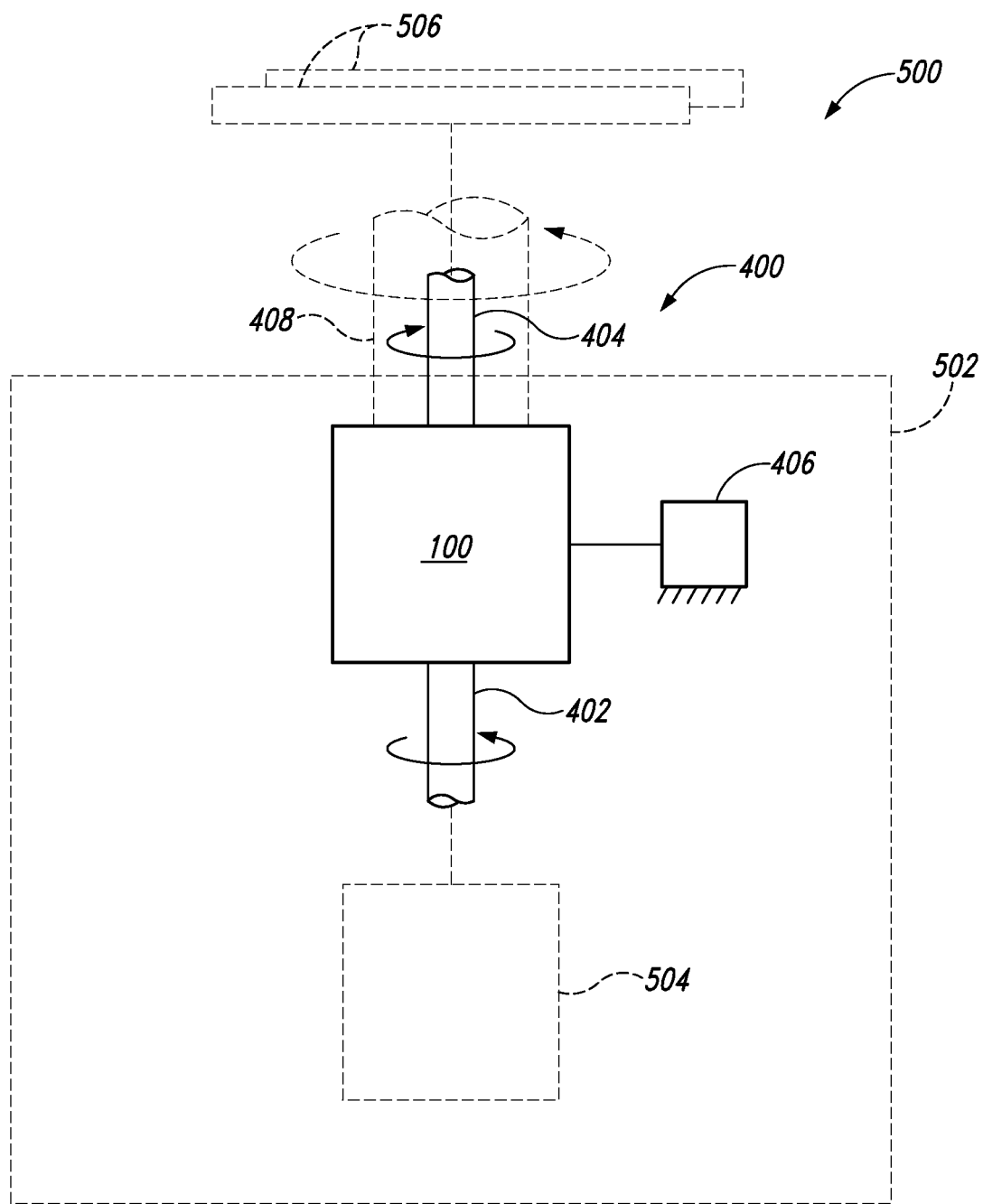
FIG. 10 is a schematic diagram representing transmissions and related apparatuses according to the present disclosure that incorporate a planetary gear system according to the present disclosure.

As mentioned, also within the scope of the present disclosure are transmissions and apparatuses that include planetary gear systems 100 according to the present disclosure. Turning now to FIG. 10, transmissions according to the present disclosure are schematically represented and indicated generally at 400. Transmissions 400 include at least a planetary gear system 100, an input shaft 402, an output shaft 404, and a frame, or housing, 406. The input shaft is operatively coupled to one of a non-fixed sun gear or a non-fixed annular gear of the planetary gear system, and the output shaft likewise is operatively coupled to one of a non-fixed sun gear or a non-fixed annular gear of the planetary gear system. The housing is operatively coupled to the fixed gear of the planetary gear system. Accordingly, rotation of the input shaft results in an opposite rotation of the output shaft, as schematically represented by the arrows in FIG. 10.

In examples of planetary gear systems 100 that are configured so that a rotational input of a non-fixed gear results in rotational outputs of two, separate non-fixed gears, as discussed herein, a corresponding transmission 400 may include a second output shaft 408 that rotates in an opposite direction of output shaft 404 in response to the rotation of the input shaft 402, as schematically and optionally illustrated in dashed lines in FIG. 10.

With continued reference to FIG. 10, apparatuses according to the present disclosure are schematically represented and indicated generally at 500. Apparatuses 500 include at least a body 502, a transmission 400 supported by the body, an input 504 operatively supported by the body and operatively coupled to the input shaft 402 of the transmission, and one or more outputs 504 operatively coupled to the output shaft(s) 408 of the transmission. Alternatively, input 504 may be in the form of an output, and output(s) 506 may be in the form of input(s). Apparatuses 500 according to the present disclosure may take any suitable form and perform any suitable application. As illustrative, non-exclusive examples, apparatuses may include vehicles, including land vehicles, marine vehicles, air vehicles, and space vehicles; machines, including machines used in manufacturing; energy generating equipment, including wind turbines and water turbines; pumps; etc. In the example of an apparatus 500 in the form of an air vehicle, the input 504 may include an engine, the output(s) 506 may include one or more rotors, and the body may include a fuselage. In the example of an apparatus in the form of a wind turbine, the input may be in the form of one or more rotors, the output may be in form of a generator, and the body may be in the form of a mast. Other types and configurations of apparatuses 500 also are within the scope of the present disclosure.

Figure 11:
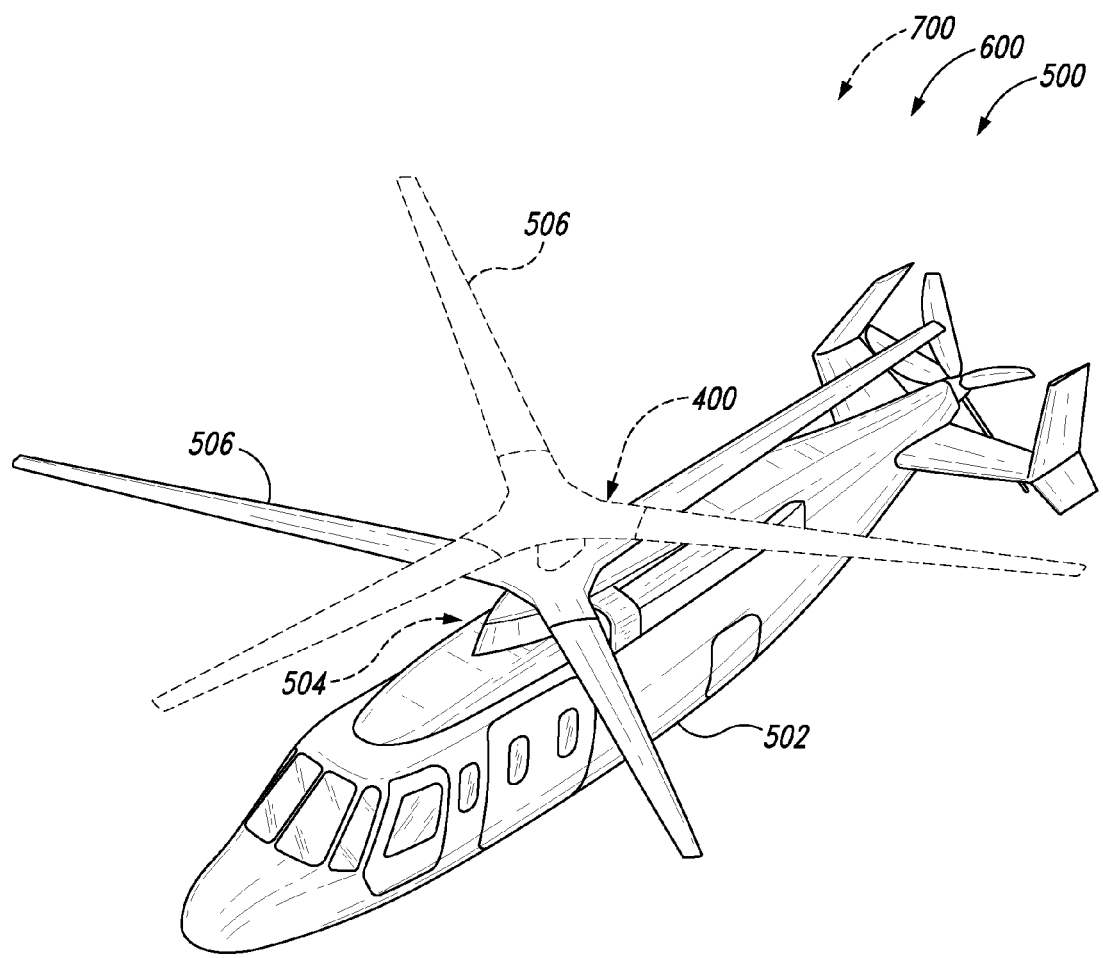
FIG. 11 is a perspective view of an example of a rotorcraft according to the present disclosure.

As an illustrative, non-exclusive example, FIG. 11 illustrates example apparatuses 500 in the form of rotorcraft, including a single rotor helicopter 600 with a single output 506 in the form of a rotor and a double rotor helicopter 700 with two outputs 506 in the form of rotors.

Illustrative, non-exclusive examples of inventive subject matter according to the present disclosure are described in the following enumerated paragraphs:

A. A planetary gear system, comprising:
a non-fixed annular gear configured to rotate about a primary rotation axis;
a non-fixed sun gear positioned within the non-fixed annular gear and configured to rotate about the primary rotation axis;
a compound planet gear operatively positioned between and meshed with the non-fixed annular gear and the non-fixed sun gear, wherein the compound planet gear includes a larger planet gear stage having a larger pitch diameter and a smaller planet gear stage operatively connected to the larger planet gear stage and having a smaller pitch diameter less than the larger pitch diameter, wherein one of the larger planet gear stage and the smaller planet gear stage is operatively meshed with the non-fixed sun gear, and wherein one of the larger planet gear stage and the smaller planet gear stage is operatively meshed with the non-fixed annular gear; and
a fixed gear having a central axis coaxial with the primary rotation axis, wherein the fixed gear is one of:
a fixed sun gear operatively meshed with one of the larger planet gear stage and the smaller planet gear stage; and
a fixed annular gear operatively meshed with one of the larger planet gear stage and the smaller planet gear stage.

A1. The planetary gear system of paragraph A, wherein the larger planet gear stage is operatively meshed with the non-fixed annular gear.

A2. The planetary gear system of paragraph A, wherein the smaller planet gear stage is operatively meshed with the non-fixed annular gear.

A3. The planetary gear system of any of paragraphs A-A2, wherein the fixed gear is the fixed sun gear operatively meshed with one of the larger planet gear stage and the smaller planet gear stage.

A4. The planetary gear system of any of paragraphs A-A2, wherein the fixed gear is the fixed annular gear operatively meshed with one of the larger planet gear stage and the smaller planet gear stage.

A4.1. The planetary gear system of paragraph A4, wherein the compound planet gear includes an upper gear stage, a middle gear stage, and a lower gear stage, wherein the upper gear stage and the lower gear stage are meshed with the fixed annular gear, and wherein the middle gear stage is meshed with the non-fixed annular gear and the non-fixed sun gear.

A4.1.1. The planetary gear system of paragraph A4.1, wherein the larger planet gear stage includes the upper gear stage and the lower gear stage, and wherein the smaller planet gear stage includes the middle gear stage.

A4.1.2. The planetary gear system of paragraph A4.1, wherein the smaller planet gear stage includes upper gear stage and the lower gear stage, and wherein the larger planet gear stage includes the middle gear stage.

A4.1.3. The planetary gear system of any of paragraphs A4.1-A4.1.2, wherein the non-fixed sun gear defines a central bore, and wherein the fixed annular gear extends over the compound planet gear and defines a shaft that extends through the central bore of the non-fixed sun gear.

A5. The planetary gear system of any of paragraphs A-A4, wherein the compound planet gear further includes a smallest planet gear stage having a smallest pitch diameter less than the smaller pitch diameter; wherein one of:
(i) the non-fixed sun gear is a first non-fixed sun gear and the planetary gear system further comprises a second non-fixed sun gear configured to rotate about the primary rotation axis and operatively meshed with the smallest planet gear stage; and
(ii) the non-fixed annular gear is a first non-fixed annular gear and the planetary gear system further comprises a second non-fixed annular gear configured to rotate about the primary rotation axis and operatively meshed with the smallest planet gear stage.

A5.1. The planetary gear system of paragraph A5, wherein the non-fixed sun gear is a first non-fixed sun gear and the planetary gear system further comprises a second non-fixed sun gear configured to rotate about the primary rotation axis and operatively meshed with the smallest planet gear stage.

A5.1.1 The planetary gear system of paragraph A5.1, wherein the fixed gear is the fixed sun gear; and
wherein the compound planet gear includes an uppermost gear stage, an upper middle gear stage, a lower middle gear stage, and a lowermost gear stage, wherein the uppermost gear stage and the lowermost gear stage are meshed with the non-fixed annular gear and the fixed sun gear, wherein the upper middle gear stage is meshed with one of the first non-fixed sun gear and the second non-fixed sun gear, and wherein the lower middle gear stage is meshed with the other of the first non-fixed sun gear and the second non-fixed sun gear.

A5.1.1.1. The planetary gear system of paragraph A5.1.1, wherein the larger gear stage includes the lower middle gear stage, wherein the smaller gear stage includes the uppermost gear stage and the lowermost gear stage, and wherein the smallest gear stage includes the upper middle gear stage.

A5.1.1.2. The planetary gear system of paragraph A5.1.1, wherein the larger gear stage includes the upper middle gear stage, wherein the smaller gear stage includes the uppermost gear stage and the lowermost gear stage, and wherein the smallest gear stage includes the lower middle gear stage.

A5.1.2. The planetary gear system of any of paragraphs A5.1-A5.1.1.2, wherein one of the first non-fixed sun gear and the second non-fixed sun gear defines a central bore, and wherein the other of the first non-fixed sun gear and the second non-fixed sun gear defines a shaft that extends through the central bore.

A5.2. The planetary gear system of paragraph A5, wherein the non-fixed annular gear is a first non-fixed annular gear and the planetary gear system further comprises a second non-fixed annular gear configured to rotate about the primary rotation axis and operatively meshed with the smallest planet gear stage.

A6. The planetary gear system of any of paragraphs A-A5.2, further comprising:
a plurality of compound planet gears operatively positioned between, meshed with, and spaced around the non-fixed annular gear and the non-fixed sun gear.

A6.1. The planetary gear system of paragraph A6, further comprising:
a carrier that interconnects the plurality of compound planet gears.

A6.1.1. The planetary gear system of paragraph A6.1, wherein the carrier does not define an input or an output of the planetary gear system.

A6.2. The planetary gear system of paragraph A6, wherein the planetary gear system is free of a carrier that interconnects the plurality of compound planet gears.

A6.3. The planetary gear system of any of paragraphs A6-A6.1, wherein the planetary gear system is free of roller bearings associated with the plurality of compound planet gears.

A6.4. The planetary gear system of any of paragraphs A6-A6.3, further comprising:
a retaining ring operatively engaged with the plurality of compound planet gears and configured to maintain operative meshing of the plurality of compound planet gears with the non-fixed annular gear and the non-fixed sun gear.

A7. The planetary gear system of any of paragraphs A-A6.4, wherein at least a subset of the gears defines double helical mesh configurations and/or C-gear configurations.

A8. The planetary gear system of any of paragraphs A-A7, wherein the non-fixed annular gear and the non-fixed sun gear are each configured to continuously rotate 360 degrees about the primary rotation axis.

A9. The planetary gear system of any of paragraphs A-A8, wherein the compound planet gear includes at least one bearing surface, and wherein the non-fixed annular gear includes at least one bearing race engaged with the at least one bearing surface.

B. A planetary gear system comprising at least one non-fixed annular gear, at least one non-fixed sun gear, at least one compound planet gear meshed between the at least one non-fixed annular gear and the at least one non-fixed sun gear, and at least one fixed gear meshed with the at least one compound planet gear, wherein a rotational input to one of the at least one non-fixed annular gear and the at least one non-fixed sun gear results in an opposite rotational output of the other of the at least one non-fixed annular gear and the at least one non-fixed sun gear.

B1. The planetary gear system of paragraph B further comprising the subject matter of any of paragraphs A-A9.

C. A transmission, comprising:
the planetary gear system of any of paragraphs A-B1;
an input shaft operatively coupled to one of the non-fixed annular gear and the non-fixed sun gear;
an output shaft operatively coupled to the other of the non-fixed annular gear and the non-fixed sun gear; and
a housing operatively coupled to the fixed gear;
wherein rotation of the input shaft in a first rotational direction results in rotation of the output shaft in a second rotational direction opposite the first rotational direction.

C1. The transmission of paragraph C when depending from paragraph A5.1, wherein the output shaft is a first output shaft, and further wherein the first output shaft is operatively coupled to the first non-fixed sun gear, the transmission further comprising:
    a second output shaft operatively coupled to the second non-fixed sun gear;
    wherein rotation of the input shaft results in rotation of the first output shaft in the second rotational direction and rotation of the second output shaft in the first rotational direction.

C2. The transmission of paragraph C when depending from paragraph A5.2, wherein the output shaft is a first output shaft, and further wherein the first output shaft is operatively coupled to the first non-fixed annular gear, the transmission further comprising:
    a second output shaft operatively coupled to the second non-fixed annular gear;
    wherein rotation of the input shaft results in rotation of the first output shaft in the second rotational direction and rotation of the second output shaft in the first rotational direction.

D. An apparatus, comprising:
    a body;
    the transmission of any of paragraphs C-C2 supported by the body;
    an input operatively supported by the body and operatively coupled to the input shaft of the transmission; and
    an output operatively coupled to the output shaft of the transmission.

D1. The apparatus of paragraph D when depending from paragraph C1 or paragraph C2, wherein the output is a first output, the apparatus further comprising:
    a second output operatively coupled to the second output shaft of the transmission.

D2. The apparatus of any of paragraphs D-D1, wherein the apparatus is a rotorcraft, the body is a fuselage, the input is an engine, and the output is a rotor, and when depending from paragraph D1, wherein the first output is a first rotor and the second output is a second rotor.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of systems and other apparatuses disclosed herein are not required to all apparatuses according to the present disclosure, and the present disclosure includes all novel and non-obvious combinations and sub-combinations of the various elements disclosed herein. Moreover, one or more of the various elements disclosed herein may define independent inventive subject matter that is separate and apart from the whole of a disclosed apparatus. Accordingly, such inventive subject matter is not required to be associated with the specific apparatuses that are expressly disclosed herein, and such inventive subject matter may find utility in apparatuses that are not expressly disclosed herein.

The invention claimed is:

1. A rotorcraft, comprising:
    a fuselage;
    a transmission supported by the fuselage, the transmission comprising:
        a planetary gear system, comprising:
            a non-fixed annular gear configured to continuously rotate about a primary rotation axis;
            a first non-fixed sun gear positioned within the non-fixed annular gear and configured to continuously rotate about the primary rotation axis;
            a second non-fixed sun gear positioned within the non-fixed annular gear and configured to continuously rotate about the primary rotation axis;
            a fixed sun gear; and
            a plurality of compound planet gears operatively positioned between the non-fixed annular gear and the fixed sun gear, wherein each compound planet gear each includes a larger planet gear stage having a larger pitch diameter, a smaller planet gear stage having a smaller pitch diameter less than the larger pitch diameter, and a smallest planet gear stage having a smallest pitch diameter less than the smaller pitch diameter, wherein the larger planet gear stages are meshed with the first non-fixed sun gear, wherein the smaller planet gear stages are meshed with the fixed sun gear, wherein the smallest planet gear stages are meshed with second non-fixed sun gear, and wherein one of the larger planet gear stages, the smaller planet gear stages, and the smallest planet gear stages are meshed with the non-fixed annular gear;
        an input shaft operatively coupled to the non-fixed annular gear;
        a first output shaft operatively coupled to the first non-fixed sun gear;
        a second output shaft operatively coupled to the second non-fixed sun gear;
        a housing operatively coupled to the fixed sun gear and supported by the fuselage;
    an engine operatively supported by the fuselage and operatively coupled to the input shaft;
    a first rotor operatively coupled to the first output shaft; and
    a second rotor operatively coupled to the second output shaft.

2. A planetary gear system, comprising:
    a non-fixed annular gear configured to rotate about a primary rotation axis;
    a non-fixed sun gear positioned within the non-fixed annular gear and configured to rotate about the primary rotation axis;
    a compound planet gear operatively positioned between and meshed with the non-fixed annular gear and the non-fixed sun gear, wherein the compound planet gear includes a larger planet gear stage having a larger pitch diameter and a smaller planet gear stage fixed to the larger planet gear stage and having a smaller pitch diameter less than the larger pitch diameter, wherein one of the larger planet gear stage and the smaller planet gear stage is operatively meshed with the non-fixed sun gear, and wherein one of the larger planet gear stage and the smaller planet gear stage is operatively meshed with the non-fixed annular gear; and a fixed gear having a central axis coaxial with the primary rotation axis, wherein the fixed gear is a fixed sun gear operatively meshed with one of the larger planet gear stage and the smaller planet gear stage.

3. The planetary gear system of claim 2, wherein the larger planet gear stage is operatively meshed with the non-fixed annular gear.

4. The planetary gear system of claim 2, wherein the smaller planet gear stage is operatively meshed with the non-fixed annular gear.

5. The planetary gear system of claim 2, further comprising:
a plurality of compound planet gears operatively positioned between, meshed with, and spaced around the non-fixed annular gear and the non-fixed sun gear.

6. The planetary gear system of claim 5, wherein the planetary gear system is free of a carrier that interconnects the plurality of compound planet gears.

7. The planetary gear system of claim 5, further comprising:
a retaining ring operatively engaged with the plurality of compound planet gears and configured to maintain operative meshing of the plurality of compound planet gears with the non-fixed annular gear and the non-fixed sun gear.

8. The planetary gear system of claim 2, wherein the non-fixed annular gear and the non-fixed sun gear are each configured to continuously rotate 360 degrees about the primary rotation axis.

9. A planetary gear system, comprising:
a non-fixed annular gear configured to rotate about a primary rotation axis;
a non-fixed sun gear positioned within the non-fixed annular gear and configured to rotate about the primary rotation axis;
a compound planet gear operatively positioned between and meshed with the non-fixed annular gear and the non-fixed sun gear, wherein the compound planet gear includes a larger planet gear stage having a larger pitch diameter and a smaller planet gear stage fixed to the larger planet gear stage and having a smaller pitch diameter less than the larger pitch diameter, wherein one of the larger planet gear stage and the smaller planet gear stage is operatively meshed with the non-fixed sun gear, and wherein one of the larger planet gear stage and the smaller planet gear stage is operatively meshed with the non-fixed annular gear; and
a fixed gear having a central axis coaxial with the primary rotation axis, wherein the fixed gear is one of:
a fixed sun gear operatively meshed with one of the larger planet gear stage and the smaller planet gear stage; and
a fixed annular gear operatively meshed with one of the larger planet gear stage and the smaller planet gear stage;
wherein the compound planet gear further includes a smallest planet gear stage having a smallest pitch diameter less than the smaller pitch diameter;
wherein one of:
(i) the non-fixed sun gear is a first non-fixed sun gear and the planetary gear system further comprises a second non-fixed sun gear configured to rotate about the primary rotation axis and operatively meshed with the smallest planet gear stage; and
(ii) the non-fixed annular gear is a first non-fixed annular gear and the planetary gear system further comprises a second non-fixed annular gear configured to rotate about the primary rotation axis and operatively meshed with smallest planet gear stage.

10. The planetary gear system of claim 9, wherein the non-fixed sun gear is a first non-fixed sun gear and the planetary gear system further comprises a second non-fixed sun gear configured to rotate about the primary rotation axis and operatively meshed with the smallest planet gear stage.

11. The planetary gear system of claim 10,
wherein the fixed gear is the fixed sun gear; and
wherein the compound planet gear includes an uppermost gear stage, an upper middle gear stage, a lower middle gear stage, and a lowermost gear stage, wherein the uppermost gear stage and the lowermost gear stage are meshed with the non-fixed annular gear and the fixed sun gear, wherein the upper middle gear stage is meshed with one of the first non-fixed sun gear and the second non-fixed sun gear, and wherein the lower middle gear stage is meshed with the other of the first non-fixed sun gear and the second non-fixed sun gear.

12. The planetary gear system of claim 11, wherein the larger gear stage includes the lower middle gear stage, wherein the smaller gear stage includes the uppermost gear stage and the lowermost gear stage, and wherein the smallest gear stage includes the upper middle gear stage.

13. The planetary gear system of claim 11, wherein the larger gear stage includes the upper middle gear stage, wherein the smaller gear stage includes the uppermost gear stage and the lowermost gear stage, and wherein the smallest gear stage includes the lower middle gear stage.

14. The planetary gear system of claim 10, wherein one of the first non-fixed sun gear and the second non-fixed sun gear defines a central bore, and wherein the other of the first non-fixed sun gear and the second non-fixed sun gear defines a shaft that extends through the central bore.

15. The planetary gear system of claim 9, wherein the non-fixed annular gear is a first non-fixed annular gear and the planetary gear system further comprises a second non-fixed annular gear configured to rotate about the primary rotation axis and operatively meshed with smallest planet gear stage.

16. The planetary gear system of claim 9, wherein the larger planet gear stage is operatively meshed with the non-fixed annular gear.

17. The planetary gear system of claim 9, wherein the smaller planet gear stage is operatively meshed with the non-fixed annular gear.

18. The planetary gear system of claim 9, further comprising:
a plurality of compound planet gears operatively positioned between, meshed with, and spaced around the non-fixed annular gear and the non-fixed sun gear.

19. The planetary gear system of claim 18, wherein the planetary gear system is free of a carrier that interconnects the plurality of compound planet gears.

20. The planetary gear system of claim 18, further comprising:
a retaining ring operatively engaged with the plurality of compound planet gears and configured to maintain operative meshing of the plurality of compound planet gears with the non-fixed annular gear and the non-fixed sun gear.

21. The planetary gear system of claim 9, wherein the non-fixed annular gear and the non-fixed sun gear are each configured to continuously rotate 360 degrees about the primary rotation axis.

* * * * *